J. C. WISWELL.

Assignor to THE WISWELL ELECTRIC MINING MACHINERY COMPANY.

ORE CRUSHER.

No. 10,659. Reissued Nov. 3, 1885.

Witnesses:
H. Brown.
Thomas E. O'Connor

Inventor:
J. C. Wiswell
by Wright & Brown
Attys.

N. PETERS, Photo-Lithographer, Washington, D. C.

UNITED STATES PATENT OFFICE.

JACOB C. WISWELL, OF MEDFORD, MASS., ASSIGNOR TO THE WISWELL ELECTRIC MINING MACHINERY COMPANY, OF PORTLAND, MAINE.

ORE-CRUSHER.

SPECIFICATION forming part of Reissued Letters Patent No. 10,659, dated November 3, 1885.

Original No. 307,513, dated November 4, 1884. Application for reissue filed September 8, 1885. Serial No. 176,541.

*To all whom it may concern:*

Be it known that I, JACOB C. WISWELL, of Medford, in the county of Middlesex and State of Massachusetts, have invented certain new and useful Improvements in Ore-Crushers, of which the following is a specification.

This invention relates to that class of ore-crushing mills in which a series of rollers are employed, and a fixed circular bed on which said rollers are adapted to travel. An example of this class of mills is shown in Letters Patent No. 296,096, granted to me April 1, 1884.

My present invention consists in the improvements in the form of the outer faces of the rollers and the corresponding portion of the circular bed, hereinafter described, whereby the meeting portion of the outer faces of the rollers with the bed is extended entirely across said faces, and the rollers are enabled to travel easily and with the minimum of friction upon the portions of the bed supporting their outer faces, as I will now proceed to describe.

Figure 1:
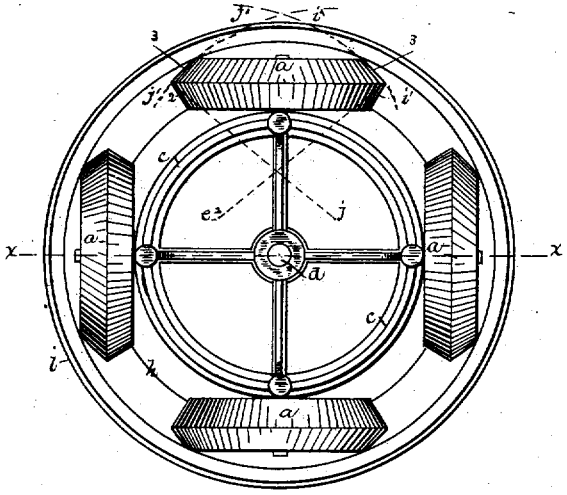
Figure 2:
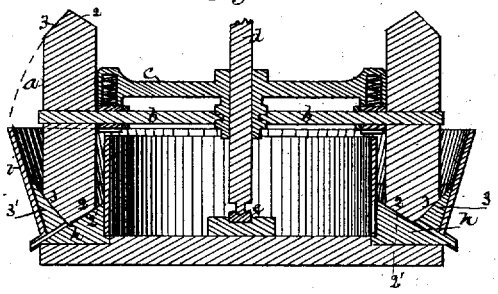

Of the accompanying drawings, forming a part of this specification, Figure 1 represents a plan view of a series of rollers and their supporting-bed embodying my improvements. Fig. 2 represents a section on line *x x*, Fig. 1.

The same letters of reference indicate the same parts in all the figures.

In the drawings, *a a a a* represent the series of crushing-rollers, which are in this instance four in number, and are mounted on radial axles *b*, which are journaled in a frame, *c*, substantially as shown in my above-named patent, said frame being affixed horizontally to a vertical shaft, *d*, which is supported at its lower end by a step, *e*, and is rotated by power suitably applied to its upper end. The periphery of each roller is composed of two inclined or beveled faces, 2 3, which are arranged to give said periphery a nearly pyramidal form in its transverse section. The inner face, 2, of each roller is shown as a conic frustum, of which the apex is the intersection of the axial line of the axles of the rollers, as shown in dotted lines in Fig. 1. Owing to this form, the periphery of the inner face of the roller adapts itself naturally to the correspondingly-formed bed, hereinafter described, and traverses the latter with ease, free from slip and lost motion, which reduces the friction to the minimum. The outer face, 3, of each roller in any portion of its transverse section presents an arc of a circle having a radius of the same length as the radius of the circle formed by the outer margin of the supporting-bed *h*, on which the rollers travel, the opposite arcs being struck from separate centers, and not from the center of the circular bed.

In forming the outer face, 3, of each roller, I observe the following rules: When the diameter of the roller at the apex of its periphery is about equal to the radius of the circle formed by the outer margin of the supporting-bed, the distance of the apex of the periphery of the roller from the center of the shaft *d* having been determined, the centers $e^2$ *j* of the arcs *i′ i′* and *j′ j′* (which the cross-section of the outer face, 3, of the roller presents) are located outside of the radial point or center of the bed, the angle being determined by the character of ore to be crushed, each roller having corresponding central points separate from each other and equidistant from the center of of the vertical shaft *d*. The circular supporting bed or trough *h* has two faces, 2′ 3′, which are so formed that the cross-section of the bed presents the exact converse of the cross-section of each roller, as shown in Fig. 2, the line of contact of each roller with the bed extending entirely across both faces of the roller, as shown.

The above-described form of the inner faces of the rollers and of the supporting-bed is fully set forth in my former patent, the novelty now presented being the form of the outer faces, 3, of the rollers and the faces 3′ of the bed. I have found by practical experience that the described form of the faces 3 and 3′ enables the rollers to run freely and naturally in a circular direction, the outer face of each roller crushing equally with the inner faces, because of their extended bearing on the bed. The rollers rotate and travel without greater friction between the outer faces, 3 and 3′, than between the faces 2 and 2′, and therefore without torsional or binding strain upon their axles.

Heretofore in mills of this class the outer faces of the rollers have generally been conefrustums, presenting straight faces in cross-section, like the inner faces. If said faces fitted snugly to the outer faces of the trough, an abrasive action would ensue between the two, as stated in my former patent, the friction attending the movement of the outer faces of the rollers being greater than that attending the movement of the inner faces; hence the outer faces of the rollers had to be slightly separated from the corresponding face of the bed. This objection and the necessity of such separation are entirely overcome by the present improvement, which effects a considerable saving in motive power and largely increases the capacity of the mill for work, in consequence of the increased area of crushing-surface and the facility which the described peculiarities of form of rollers and bed afford in aiding the discharge of pulverized ore from the screen. Said ore is thrown upward and outward by centrifugal force of the revolving rollers, and escapes through a screen or screens in the curb *i*, surrounding the bed or trough, as described in my former patent. Suitable openings are formed at the bottom of the bed or trough to permit the drawing off of the amalgam and materials used in cleaning the trough.

It is obvious that one roll may be employed instead of a series without departing from the spirit of my invention.

I am aware of the expired patent to Cram, No. 8,718, dated February 10, 1852, for "ore-mills," in which the outer faces of the rollers were arcs described from a common center, which was the center of the annular bed. By my improvement the outer faces are arcs struck from different centers not coincident with that of the bed.

I claim as my invention—

A crushing-roller adapted to travel in a circular path, and having the inner crushing-face, 2, a cone frustum, and the outer crushing-face, 3, in cross-section the arc of a circle, the opposite arcs having different radial centers, not coinciding with that of the bed, in combination with the annular bed or trough formed to present in cross-section the exact converse of the cross-section of the roller, whereby an extended bearing between the roller and outer portion of the bed is afforded, and the roller is enabled to travel easily with the minimum of friction, substantially as set forth.

In testimony whereof I have signed my name to this specification, in the presence of two subscribing witnesses, this 20th day of August, 1885.

JACOB C. WISWELL.

Witnesses:
C. F. BROWN,
H. BROWN.